US012341799B2

(12) United States Patent
Herszfang

(10) Patent No.: US 12,341,799 B2
(45) Date of Patent: Jun. 24, 2025

(54) CLOUD ACTIVITY ANOMALY DETECTION

(71) Applicant: Zscaler, Inc., San Jose, CA (US)

(72) Inventor: Hila Paz Herszfang, Tel-Aviv (IL)

(73) Assignee: Zscaler, Inc., San Jose, CA (US)

( * ) Notice: Subject to any disclaimer, the term of this patent is extended or adjusted under 35 U.S.C. 154(b) by 218 days.

(21) Appl. No.: 18/346,405

(22) Filed: Jul. 3, 2023

(65) Prior Publication Data

US 2025/0016181 A1    Jan. 9, 2025

(51) Int. Cl.
*H04L 9/40* (2022.01)
*G06F 11/07* (2006.01)
*G06F 11/30* (2006.01)
*G06F 21/55* (2013.01)
*G06F 21/56* (2013.01)

(52) U.S. Cl.
CPC ...... *H04L 63/1425* (2013.01); *G06F 11/0709* (2013.01); *G06F 11/3034* (2013.01); *H04L 63/1416* (2013.01); *G06F 21/552* (2013.01); *G06F 21/567* (2013.01)

(58) Field of Classification Search
CPC .. G06F 21/567; G06F 21/552; G06F 11/0709; G06F 11/3034
See application file for complete search history.

(56) References Cited

U.S. PATENT DOCUMENTS

| | | | |
|---|---|---|---|
| 2021/0126938 A1* | 4/2021 | Trost | G06F 21/552 |
| 2021/0400070 A1* | 12/2021 | Ackerman | G06F 21/567 |
| 2022/0239673 A1 | 7/2022 | Kfir et al. | |
| 2022/0400128 A1 | 12/2022 | Kfir et al. | |
| 2023/0164183 A1* | 5/2023 | Kothari | H04L 63/1416 726/23 |
| 2023/0229765 A1* | 7/2023 | Saadon | G06F 21/552 726/23 |
| 2023/0262081 A1* | 8/2023 | Malamut | G06F 11/3034 726/1 |
| 2023/0325292 A1* | 10/2023 | Ardel | G06N 3/0455 |
| 2024/0143427 A1* | 5/2024 | Sivakumar | G06F 11/0709 |
| 2024/0250960 A1* | 7/2024 | Danino | H04L 63/1416 |

* cited by examiner

*Primary Examiner* — Barbara B Anyan
(74) *Attorney, Agent, or Firm* — Baratta Law PLLC; Lawrence A. Baratta, Jr.

(57) ABSTRACT

Systems and methods for cloud activity anomaly detection include receiving historical data from a historical time span associated with an identity, wherein the historical data includes activities performed by the identity and times when the activities took place; computing an activity prediction for a future time span based on the historical data, wherein the activity prediction specifies intervals within the future time span when future activities are expected to take place; performing inline monitoring of activity between the identity and a cloud-based system; and responsive to an activity taking place outside of the activity prediction, performing an action based thereon.

16 Claims, 14 Drawing Sheets

CLOUD ACTIVITY ANOMALY DETECTION

FIELD OF THE DISCLOSURE

The present disclosure generally relates to computer networking systems and methods. More particularly, the present disclosure relates to systems and methods for cloud activity anomaly detection.

BACKGROUND OF THE DISCLOSURE

Analyzing human and non-human cloud activity is crucial for any enterprise to detect suspicious behavior. In order to protect both systems and users, automated tools are required to monitor network activities through such cloud-based systems. Currently, security providers do not have enough human resources to analyze every cloud activity. Even dedicated analysis tools aren't thorough enough unless compared to other behaviors. As organizations continue to utilize cloud computing, it is essential to exhaustively and precisely detect suspicious cloud activity to uncover security risks. The present disclosure provides systems and methods for detecting suspicious activity by utilizing historical identity activity.

BRIEF SUMMARY OF THE DISCLOSURE

In various embodiments, a non-transitory computer-readable medium includes instructions, a method includes steps, and a cloud-based system includes one or more processors and memory storing instructions that cause the processor to perform steps of receiving historical data from a historical time span associated with an identity, wherein the historical data includes activities performed by the identity and times when the activities took place; computing an activity prediction for a future time span based on the historical data, wherein the activity prediction specifies intervals within the future time span when future activities are expected to take place; performing inline monitoring of activity between the identity and a cloud-based system; and responsive to an activity taking place outside of the activity prediction, performing an action based thereon.

The steps can further include wherein the activity prediction indicates whether activity is expected or not expected by the identity within each of the intervals of the future time span. The future time span can be a week and each of the intervals can be one hour, wherein the activity prediction specifies during which hours of the week activity is expected for the identity. The steps can further include computing an anomaly score for each interval based on the activity prediction, wherein the anomaly score represents a risk associated with an activity taking place during each of the intervals. An action can be performed responsive to an activity taking place during an interval with an anomaly score which exceeds a threshold. The identity can be a human identity or a non-human identity. The steps can further include providing a Graphical User Interface (GUI) displaying a visualization of the historical data, the activity prediction, and monitored data. The steps can further include computing an in-sample activity prediction for a time span within the historical time span; and computing a confidence score based on a comparison of the in-sample activity prediction and historical data from the time span. The action can include notifying an administrator of the activity. The inline monitoring can include comparing real-time activity of the identity to the activity prediction.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

The present disclosure relates to systems and methods for cloud activity anomaly detection. Cloud computing and on-demand resources are gaining worldwide traction as applications are moved to cloud-based systems. In order to protect both systems and users, automated tools are required to monitor the network activities through such cloud-based systems. Currently, security stakeholders do not have enough human resources to analyze every cloud activity, and even dedicated analysis tools aren't thorough enough unless compared to other behaviors. As organizations utilize cloud computing more, it is essential to detect, exhaustively and precisely, suspicious cloud activity to uncover security risks.

Machine Learning (ML) techniques are proliferating and offer many use cases. In network and computer security, there are various use cases for machine learning, such as malware detection, identifying malicious files for further processing such as in a sandbox, user risk determination, content classification, intrusion detection, phishing detection, suspicious behavior, etc. The general process includes training where a machine learning model is trained on a dataset, e.g., data including malicious and benign content or files, and, once trained, the machine learning model is used in production to classify unknown content based on the training.

Also, the traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

The services disclosed herein can be combined with machine learning both in training and production. Specifically, training requires a large data set with labels for training a machine learning model. One advantage of the cloud service is its access to a large data set which can be monitored, labeled, and used for training machine learning models. Once a model is trained, it can be used in production, e.g., for identifying malware, detecting improper activity, and the like.

Example Cloud-Based System Architecture

Figure 1A:
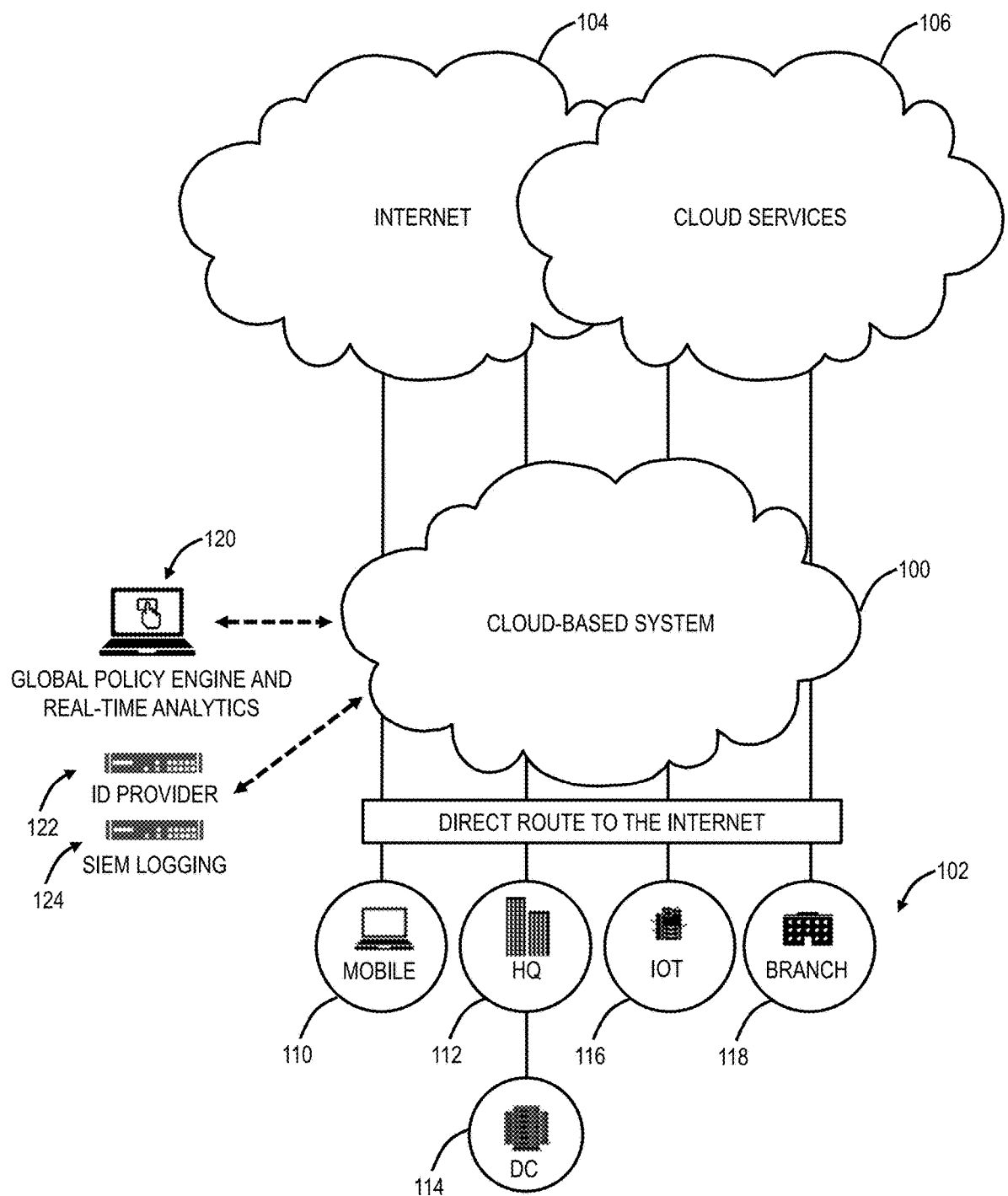
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
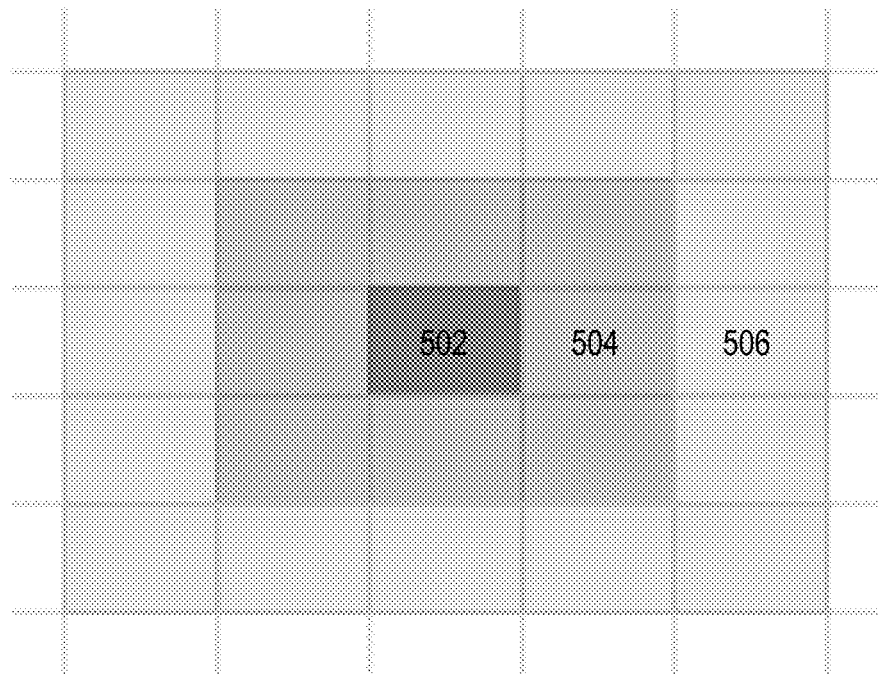
FIG. 5 is a diagram of decaying importance associated with potential risk.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
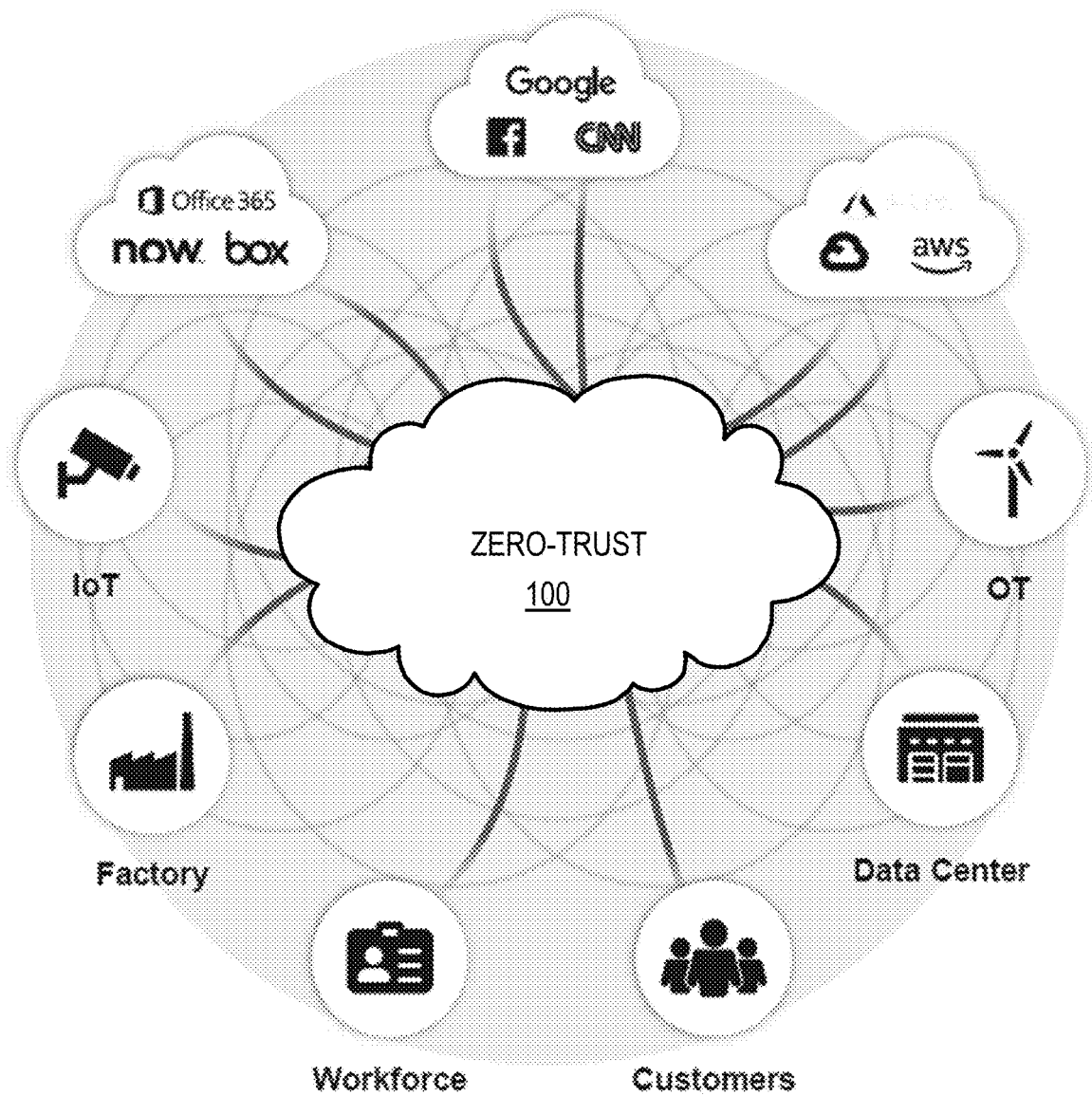
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
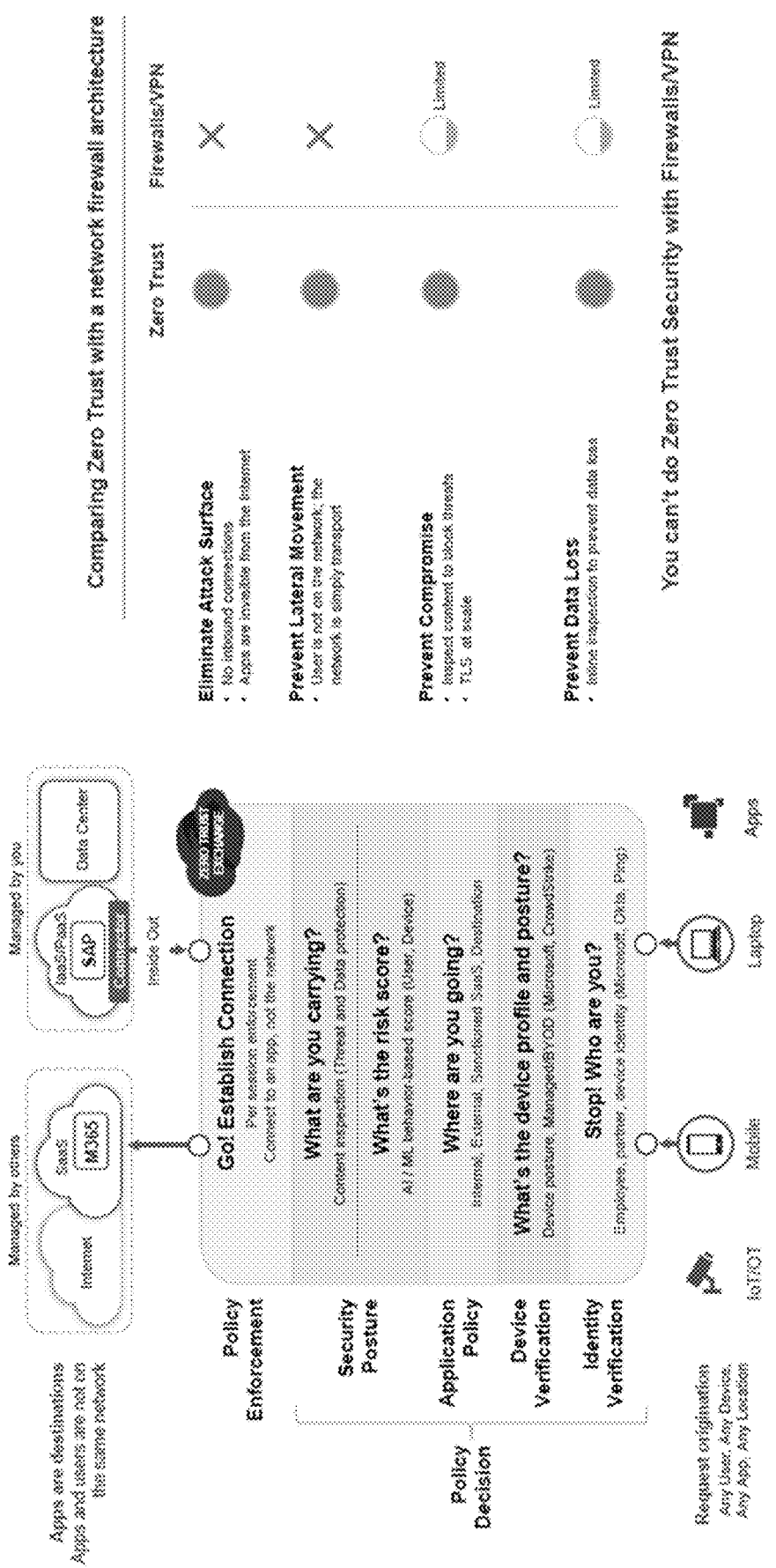
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
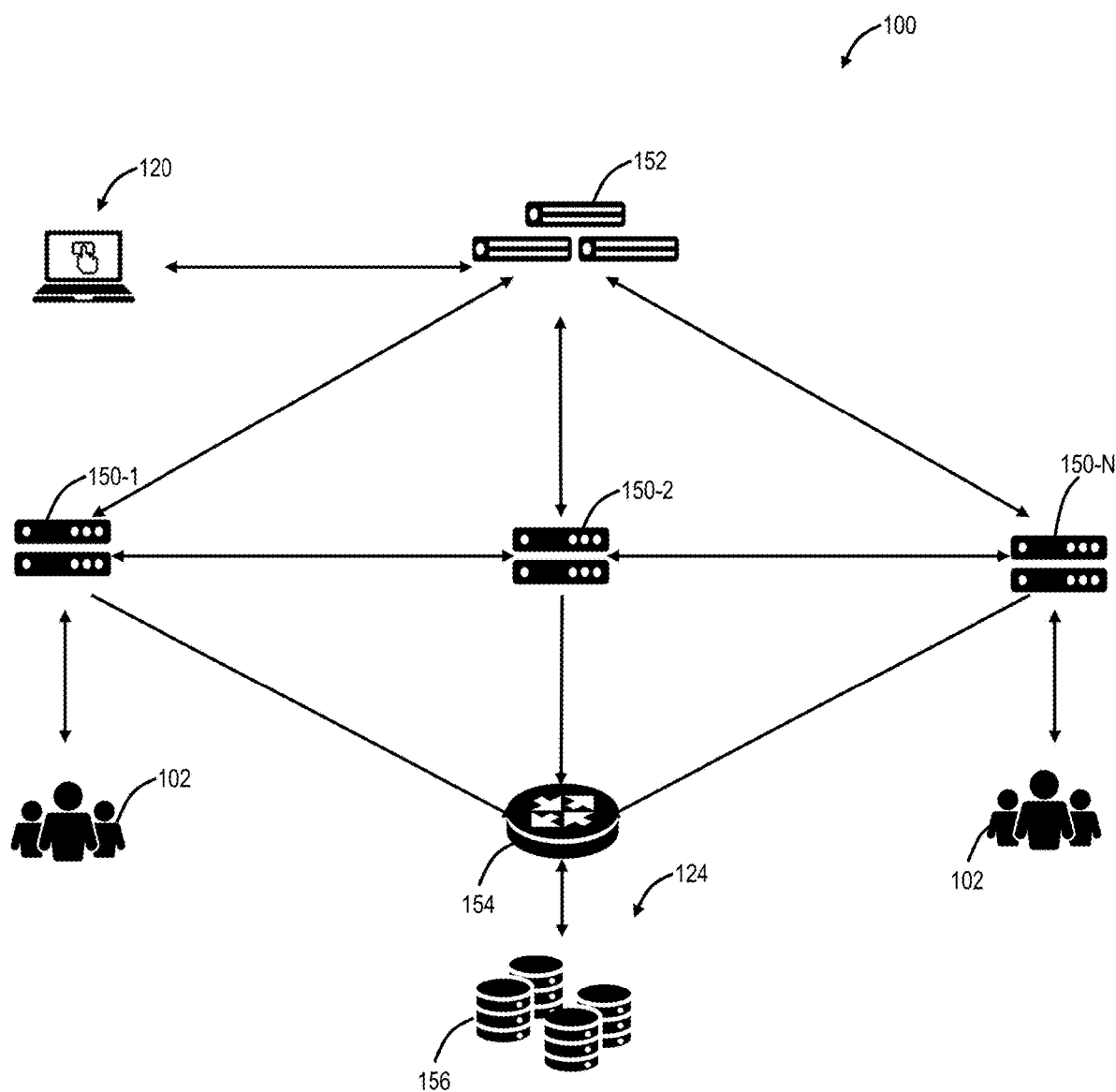
FIG. 2 is a network diagram of an example implementation of the cloud-based system.
Figure 4:
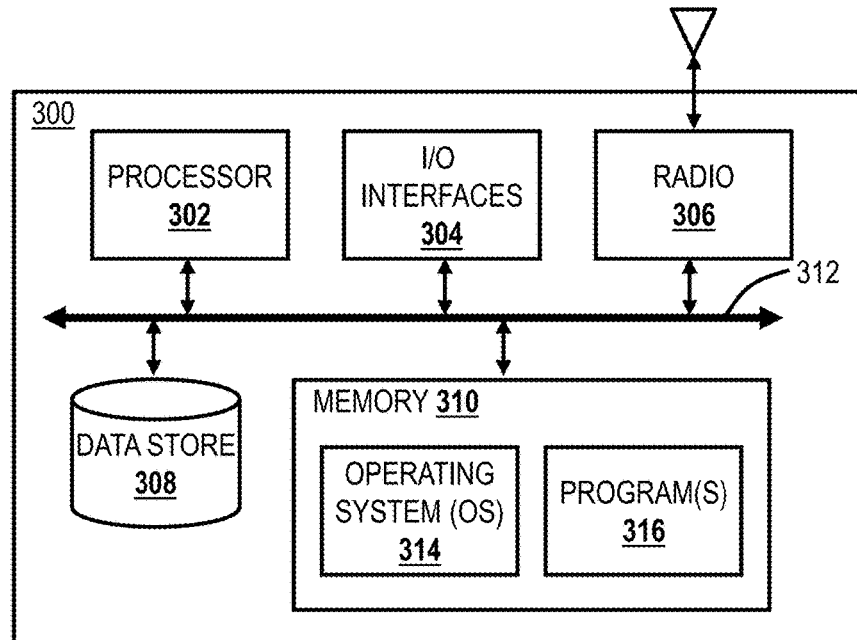

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
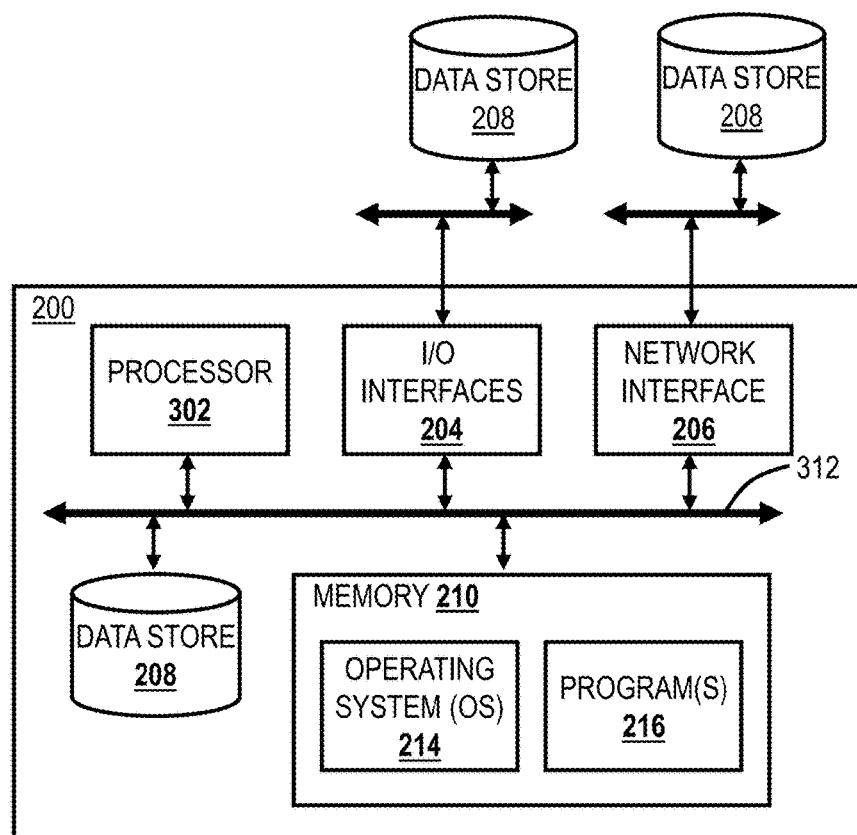
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Machine Learning in Network Security

Machine learning can be used in various applications, including malware detection, intrusion detection, threat classification, the user or content risk, detecting malicious clients or bots, detecting suspicious behavior, etc. In a particular use case in the present disclosure, machine learning is utilized to detect anomalous activity hours. That is, a machine learning model is built and trained as described herein to perform the identity profiling and alert on any abnormal activities which deviate from patterns.

Anomaly Detection

Again, cloud computing and on-demand resources are gaining worldwide traction as applications are moved to cloud-based systems. In order to protect both systems and users, automated tools are required to monitor the network activities through such cloud-based systems. Currently, security stakeholders do not have enough human resources to analyze every cloud activity, and even dedicated analysis tools aren't thorough enough unless compared to other behaviors. As organizations utilize cloud computing more, it is essential to detect, exhaustively and precisely, suspicious cloud activity to uncover security risks.

Common approaches of rule-based alerts on cloud activities are not precise, nor exhaustive. For example, one rule may be to alert on any user activity which happens in a time which the user hasn't acted before. This approach is not precise and results in a high number of false positives because user activity typically varies from week to week (i.e., a human user with changing hourly shifts). This approach is also not exhaustive because the risk for some identities is larger than others. For example, systems can utilize scheduled automated activities, such as cron jobs, that operate at specific times, dates, etc. or more specifically, a system (non-human identity) can be configured to perform an activity exactly once a day at a specific time. If such a system demonstrates a slight deviation from this pattern, it is considered far more risky than a human identity that operates in varying hours.

The present disclosure provides a flexible and lightweight anomaly score mechanism to rank an activity based on risk associated with the time the activity takes place. The lightweight application is simple to deploy on large cloud deployments with hundreds of thousands, or even millions of cloud identities, performing activities. In various embodiments described herein, the times of activities can be aggregated to hourly intervals, but it will be appreciated that the present mechanism can be based on intervals of seconds, minutes, etc. for performing anomaly detection at any granularity.

The present systems and methods determine a matrix of potential anomaly scores associated with an identity (used by either human entity and non-human entity) to perform at least one activity in the cloud-based system. An activity can be any action performed by the identity through the cloud-based system. Again, the resolution of each interval of the present example is 1 hour, but other resolutions are also contemplated herein. The determined anomaly score can be stored for each interval as a floating point number or other lightweight format. If an activity occurs within a risky interval, an alert can be raised to a cloud administrator and/or the score can be combined with additional calculated factors. The anomaly score is a function of the historical behavior of the identity, factoring in both potential risk and in-sample confidence, further described herein.

Given a number of previous weeks (k), an activity prediction for a day of week (d) and an hour of day (h) can be determined as follows.

$$\text{Prediction}_{d,h} = \frac{1}{2^k - 1} \cdot \sum_{w=1}^{k} 2^{w-k} \cdot \text{activity}_{w,d,h}$$

In various embodiments, the day of week (d) is in a range of 0-6 and the hour of day (h) is in a range of 0-23. For example, to model an activity prediction of Monday (d=0) at 10 am (h=10) with 2 weeks of historical data (k=2) and activity on the first Monday at 10 am of the historical data, the equation looks as follows.

$$\text{Prediction}_{(0,10)} = \frac{1}{2^2 - 1} \cdot (2^0 + 0) = \frac{1}{3}$$

Alternatively, if there was only activity on the second Monday at 10 am of the historical data, the activity prediction would yield:

$$\text{Prediction}_{(0,10)} = \frac{1}{2^2 - 1} \cdot (0 + 2^1) = \frac{2}{3}$$

And if there was activity on both Mondays at 10 am of the historical data, the activity prediction would be 1, i.e., the activity prediction would fully expect there to be activity on a next Monday at 10 am.

$$\text{Prediction}_{(0,10)} = \frac{1}{2^2 - 1} \cdot (2^0 + 2^1) = 1$$

Given an activity prediction for a next week (k+1) the present mechanisms can determine the potential risk if an action occurs. The potential risk can be contemplated on a scale from 0-1 and determined as follows.

$$\text{potentialRisk}_{D,H} = \prod_{g=0}^{2} \min_{\substack{d \in [D-g, D+g] \\ h \in [H-g, H+g]}} \left(1 - 2^{-g} \cdot \text{prediction}_{d,h}\right)$$

FIG. 5 is a diagram of decaying expectations associated with potential risk. Visually, in the present example, the mechanisms multiply the complementary to the predication on the first, second, and third cycle to the hour with an exponentially decaying expectation. In FIG. 5, the blocks represent hours, where the y-axis is hours of a day and the x-axis is the day of the week. The dark block 502 represents an hour where activity is expected, wherein the expectation of activity decays further from the expected hour, represented by the lighter shaded blocks 504 and 506. As expectation of activity decays, the potential risk increases, meaning that more risk is contemplated with activities taking place when not expected based on the historical data. For example, calculating a potential risk for Monday at 10 am can provide the following. If the activity prediction for Monday at 10 am is 1, the potential risk is determined to be 0.

$$(1-1) \cdot (1-2^{-1} \cdot 0) \cdot (1-2^{-2} \cdot 0) = 0.0$$

If the activity prediction for Monday at 9 am is 0.5 with activity predictions at all other hours being 0, the potential risk will be 0.25.

$$(1-0.5) \cdot (1-2^{-1} \cdot 1) \cdot (1-2^{-2} \cdot 0) = 0.25$$

If the activity prediction for Monday at 10 am is 0.5, and an activity prediction for Sunday at 11 am is 1, the potential risk for an activity on Monday at 10 am is determined to be 0.375.

$$(1-0.5) \cdot (1-2^{-1} \cdot 0) \cdot (1-2^{-2} \cdot 1) = 0.375$$

The present mechanisms can be adapted to further determine a confidence for any identity that reflects the model's ability to determine potential risk correctly. This is done by comparing actual activities to the model's activity predictions, with 1 representing full confidence in the ability of the model to identify potential risk, and 0 representing no confidence in the model's abilities. The model can use k−1 weeks of historical data to model the kth week, and then penalize the confidence on the average error rate. More particularly, the systems compute an in-sample activity prediction for a time span within the historical time span (the kth week) and compute a confidence score based on a comparison of the in-sample activity prediction and historical data from the kth week. For example, the confidence calculation may be done by the following formula.

$$\text{condidence} = 1 - \frac{1}{\sum \text{activity}_{d,h}} \sum_{h=0}^{23} \sum_{d=0}^{6} \text{PotentialRisk}_{d,h} \cdot \text{activity}_{d,h}$$

An anomaly score of an identity to act on a specific hour is determined by the product of the potential risk for that hour and the confidence. For example, for an hour with a potential risk (anomaly score) of 1 and a confidence of 0.5, the anomaly score is 0.5. Similarly, for an identity, if an hour has a potential risk of 1 and a confidence of 0, then the anomaly score for that hour is 0.

Figure 6A:
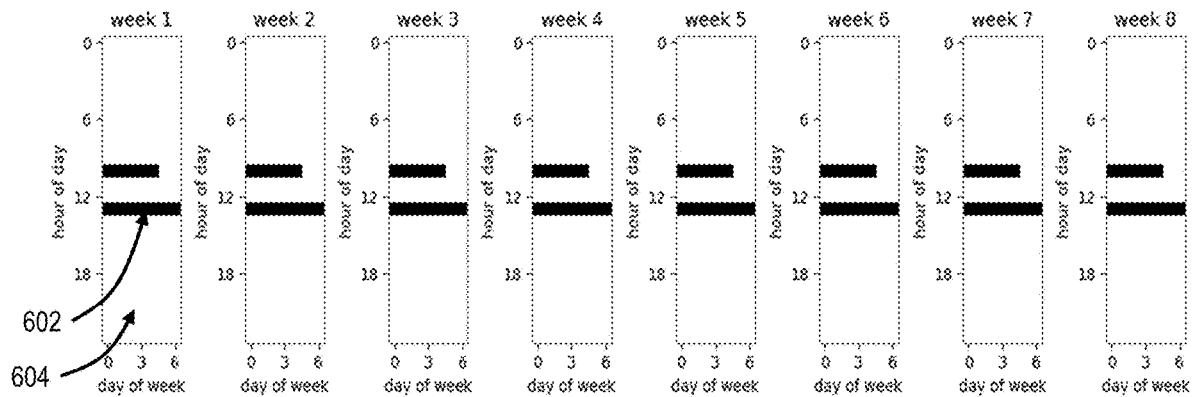
FIG. 6A is a visual representation of fully repeating identity behavior.

In various embodiments, visualizations can be provided (i.e., through a Graphical User Interface (GUI)) representing identity activities as well as heat maps representing activity predictions of future activities. FIG. 6A is a visual representation of aggregated data of fully repeating behavior where the y-axis is hours of a day and the x-axis is the day of the week, thus creating the intervals. Again, such behavior can be indicative of an identity performing scheduled automated activities, such as cron jobs. Also, the collection of the historical data shown in FIG. 6A can be part of the inline monitoring features of the cloud-based system disclosed herein. The historical data can include, without limitation, the various activities performed by the identity and the times when each activity took place. The visualization represents a 24×7 matrix of hours for each week of the historical data. The shaded regions 602 of the visualizations indicate hours where activity was identified for the identity while the blank regions 604 represent hours where no activity was identified in the historical data.

Figure 6B:
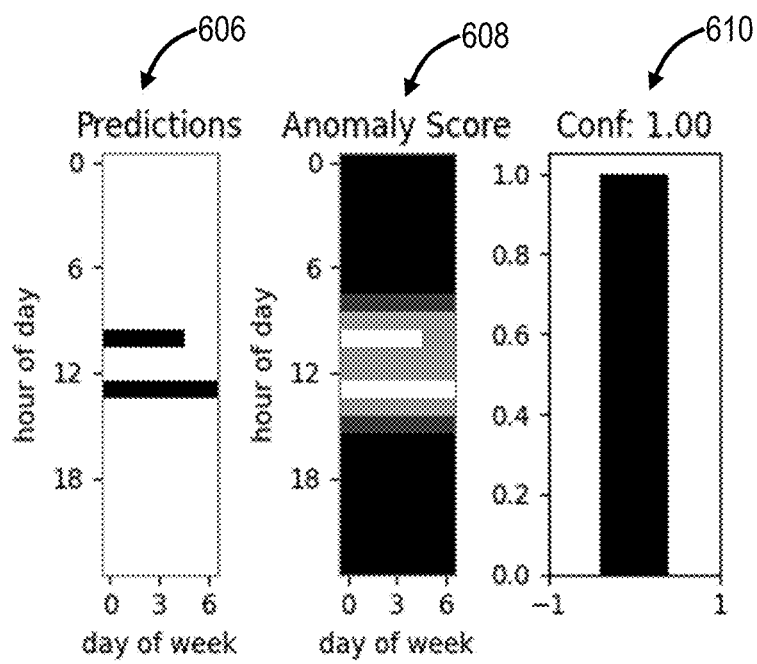
FIG. 6B shows a prediction matrix, an anomaly score matrix, and a confidence level based on the data in FIG. 6A.

FIG. 6B shows an activity prediction matrix 606, an anomaly score matrix 608, and a confidence level 610 based on the data in FIG. 6A. The activity prediction matrix 606 shows the activity prediction, and is determined via the steps disclosed herein, and resembles the historical data strongly due to its repetitive nature. The anomaly score matrix 608 resembles a heat map where darker areas represent higher risk if activity is detected during those hours. That is, during the inline monitoring of live data, if activity for this specific identity is detected within the hours represented by the darker regions, alerts can be sent to notify an administrator of suspicious behavior for the identity. As shown by the figures, the anomaly score increases as one moves further away from the intervals with predicted activity. This is represented by the different shades assigned to the hours in the anomaly score matrix 608. Because the present time spans and intervals are shown as matrices, the intervals can be referred to as cells of the matrix. More particularly, the darkness of a cell represents the magnitude of its anomaly value. For example, a white cell in the anomaly score matrix 608 represents no risk at all, and a black cell represents a full risk. If an unexpected behavior occurs in the following week, an action is performed, such as alerting an administrator.

Figure 6C:
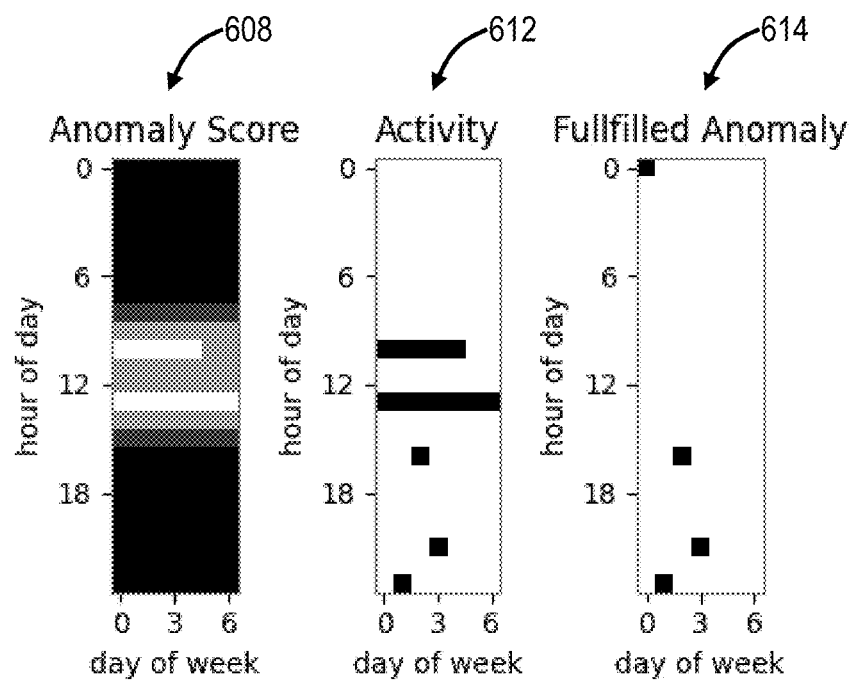
FIG. 6C shows the anomaly score matrix, an activity matrix, and a fulfilled anomaly matrix based on the data of FIG. 6A and live monitored data.

FIG. 6C shows the anomaly score matrix 608, an activity matrix 612, and a fulfilled anomaly matrix 614 based on the data of FIG. 6A and live monitored data. The activity matrix 612 includes activities monitored for the identity during a monitoring phase, i.e., during inline monitoring of real-time traffic associated with the identity. The monitoring phase takes place after creating the activity prediction matrix 606 and anomaly score matrix 608. Again, the monitoring can be inline monitoring of identity activity through the cloud-based system as described herein. The activity matrix 612 shows during which hours activity was detected for the identity during the monitoring phase, represented by the darkened cells. Finally, the fulfilled anomaly matrix 614 shows which of the monitored activities present a risk based on the anomaly score matrix 608. Again, the darkness of a cell (interval) in the fulfilled anomaly matrix 614 represents the magnitude of its anomaly value, i.e., how risky the monitored activity is.

Figure 7A:
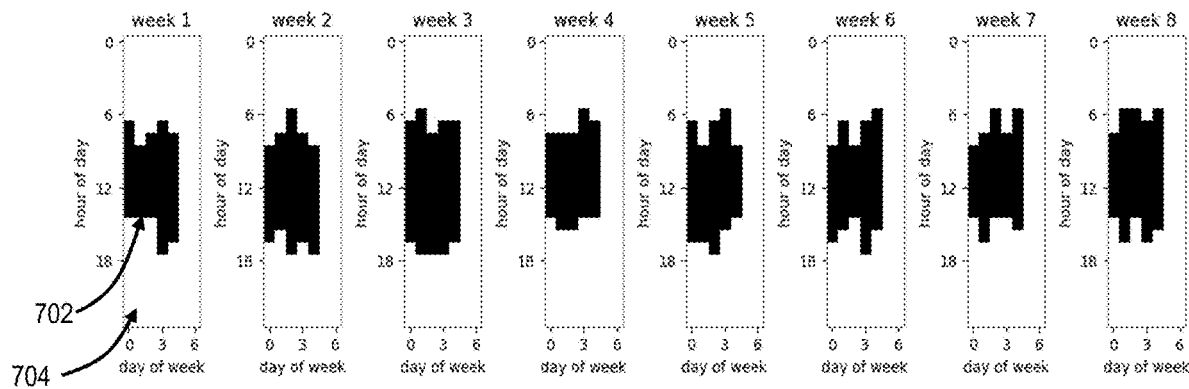
FIG. 7A is a visual representation of aggregated data of fully semi-repeating behavior.

FIG. 7A is a visual representation of aggregated data of semi-repeating behavior. Such behavior can be indicative of a human identity performing job related activities. Again, the collection of the data shown in FIG. 7A can be part of the inline monitoring features of the cloud-based system disclosed herein, wherein the data shown in FIG. 7A includes historical data for the identity over a number of weeks. The visualization represents a 24×7 matrix of hours for each week of the historical data. The shaded regions 702 of the visualizations indicate hours where activity was identified for the identity while the blank regions 704 represent hours where no activity was identified in the historical data. Because, in this example, the identity is a human identity, the shaded regions 702 resemble a typical work week with slightly varying hours of activity and no activity during weekend days.

Figure 7B:
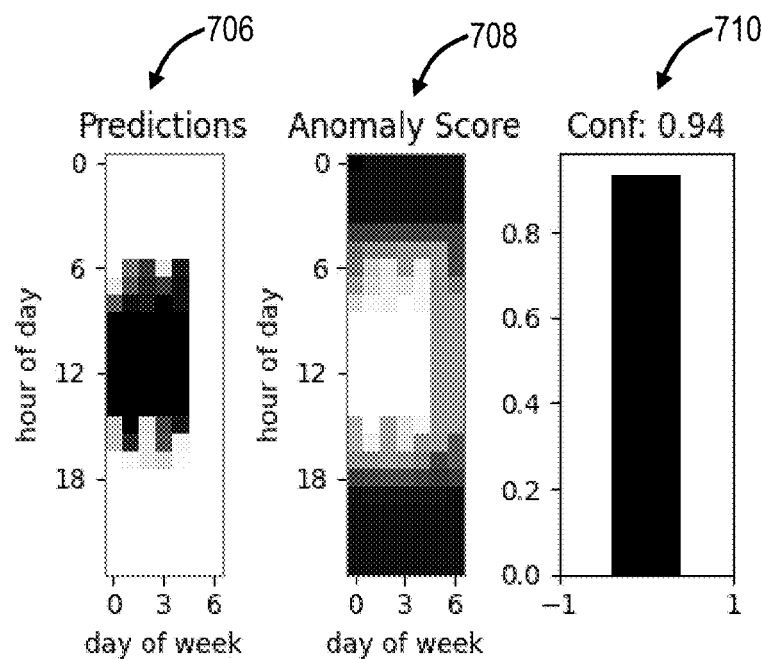
FIG. 7B shows a prediction matrix, an anomaly score matrix, and a confidence level based on the data in FIG. 7A.

FIG. 7B shows an activity prediction matrix 706, an anomaly score matrix 708, and a confidence level 710 based on the data in FIG. 7A. The activity prediction matrix 706 moderately resembles the historical data due to its mostly repetitive nature. Again, as shown by the anomaly score matrix 708, the anomaly score assigned to each cell increases as one moves further away from the predicted activity. This is represented by the different shades assigned to the hours in the anomaly score matrix 708. These varying anomaly scores are more present due to the more variable historical data, indicative of a human identity.

Figure 7C:
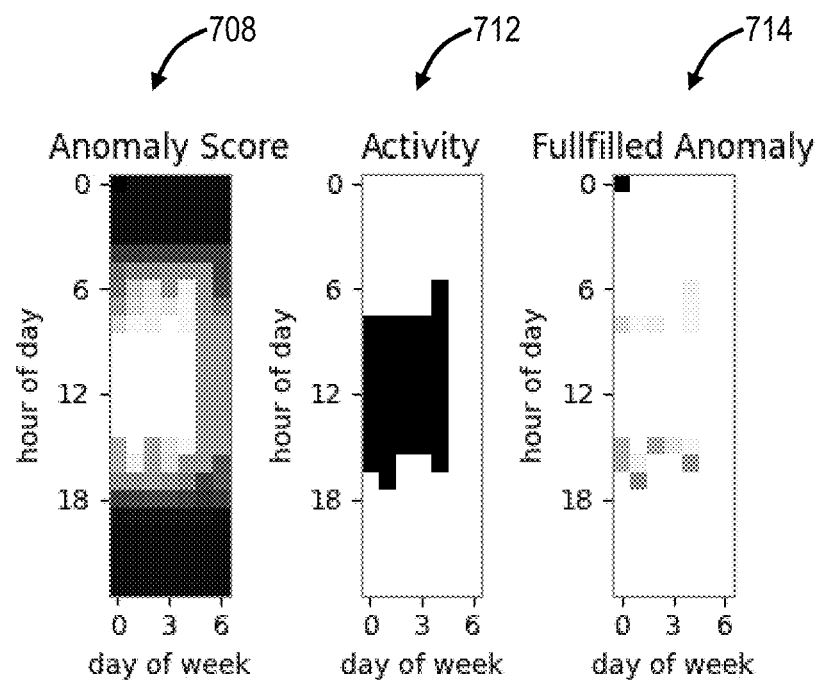
FIG. 7C shows the anomaly score matrix, an activity matrix, and a fulfilled anomaly matrix based on the data of FIG. 7A and live monitored data.

FIG. 7C shows the anomaly score matrix 708, an activity matrix 712, and a fulfilled anomaly matrix 714 based on the data of FIG. 7A and live monitored data. The activity matrix 712 includes activities monitored for the identity during the monitoring phase. Again, the monitoring phase takes place after creating the activity prediction matrix 706 and anomaly score matrix 708. The activity matrix 712 shows during which hours activity was detected for the identity during the monitoring phase, represented by the darkened cells. Finally, the fulfilled anomaly matrix 714 shows which of the monitored activities present a risk based on the anomaly score matrix 708. Again, the darkness of a cell (hour) in the fulfilled anomaly matrix 714 represents the magnitude of its anomaly value. In this example, the monitored activity does not deviate much from the activity prediction. This is shown by the lighter shaded cells in the fulfilled anomaly matrix 714. Again, the anomaly score assigned to a specific hour (cell) is on a scale between 0 and 1. Based on preconfigured policy, action can be taken based on the anomaly score. For example, a threshold anomaly value can be configured which causes the present systems to perform an action if an anomaly score of a cell goes beyond the threshold value.

Figure 7D:
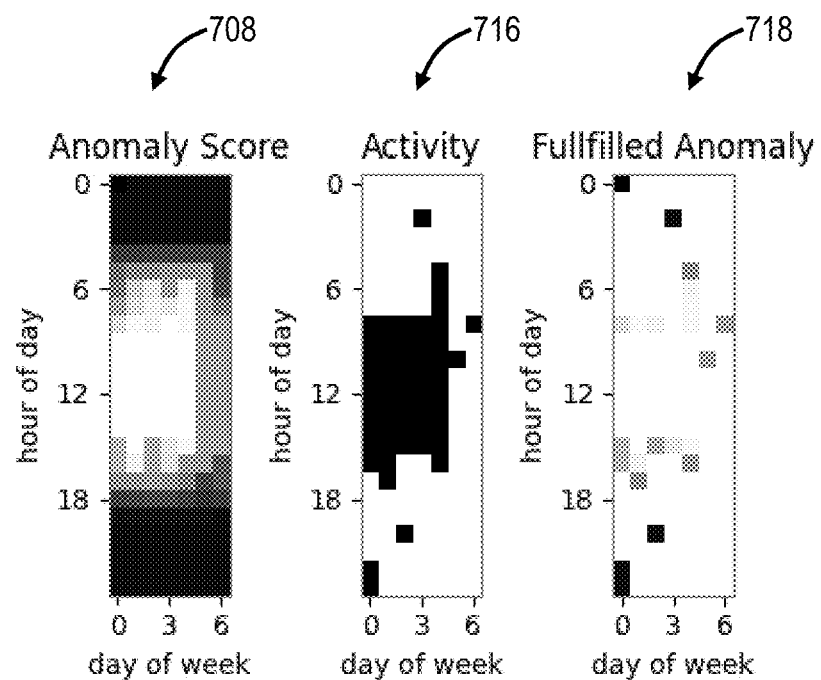
FIG. 7D shows the anomaly score matrix, an activity matrix, and a fulfilled anomaly matrix representing more deviating behavior of the identity.

FIG. 7D shows the anomaly score matrix 708, an activity matrix 716, and a fulfilled anomaly matrix 718 representing more deviating behavior of the identity. In the example of FIG. 7D, more deviating behavior was monitored for the identity during the monitoring phase, represented by the activity matrix 716. As a result, the hours which included activity that are further from the predicted activity incur a higher anomaly score, shown by the darker shaded cells in the fulfilled anomaly matrix 718.

It will be appreciated that the present systems can be adapted to perform the anomaly detection for specific identities (human and non-human) and/or groups of identities. Additionally, the present disclosure provides various examples which utilize historical data collected over a specific time span. It will be appreciated that the present anomaly detection systems and methods can utilize any time span of historical data, and the examples herein which utilize 8 weeks of data are non-limiting. Further, the granularity of the data is described as having hourly intervals, although the granularity can be seconds, minutes, hours, etc.

Anomaly Detection Process

In an embodiment, a lightweight vector is calculated weekly to estimate the likelihood of timing of identity activities. If an activity with a low likelihood occurs (i.e., an activity within an interval with a high anomaly score), the present systems can be adapted to alert a cloud administrator. The process begins with the collection of historical data. This data collection can be part of the inline monitoring features of the cloud-based system disclosed herein. For a given identity, a predetermined number of weeks of activity is aggregated, in this example 8 weeks. The predetermined number of weeks of historical data can further be referred to as a historical time span. The present systems then indicate, for each hour (interval), if it includes any activity by the identity. This process results in a 24×7×8 boolean matrix of intervals within the time span.

Given the 7 first weeks of the aggregated data, the systems calculate the in-sample confidence for the 8th week. That is, the systems calculate an activity prediction for the 8th week, and compare the actual historical data from the 8th week to the in-sample activity prediction. Then, given the 8 weeks of aggregated data, an activity prediction for the 9th week (future time span) is determined as described above (activity prediction matrix). The potential risk for each interval of the 9th week is established (anomaly score matrix) based on the determined activity prediction as described herein. Finally, based on the confidence and the potential risk for each interval, a 24×7 matrix is produced representing the likelihoods of activities for the identity in the future time span (i.e., the 9th week). In various embodiments, the present systems can be adapted to further monitor, during the monitoring phase, identity activity through the cloud-based system during the future time span to detect and alert on activities which take place during unlikely intervals (i.e., high risk activities). In various embodiments, an activity which takes place during an unlikely interval will incur the anomaly score assigned to that interval, wherein a higher anomaly score represents higher risk. Further, the systems are adapted to show, via a GUI, the visualizations described in the figures. This GUI can be presented to administrators via a user device and the like.

In various embodiments, a machine learning model is trained by utilizing the historical data to perform the steps described herein. In such embodiments, the system will determine a risk of an activity by way of the machine learning model. Machine learning can be used in various applications, including malware detection, intrusion detection, threat classification, the user or content risk, detecting malicious clients or bots, detecting suspicious behavior, etc. In a particular use case in the present disclosure, machine learning can be used to determine risk of an action. That is, a machine learning model is built and trained as described herein to perform the anomaly detection described in the present disclosure.

Figure 8:
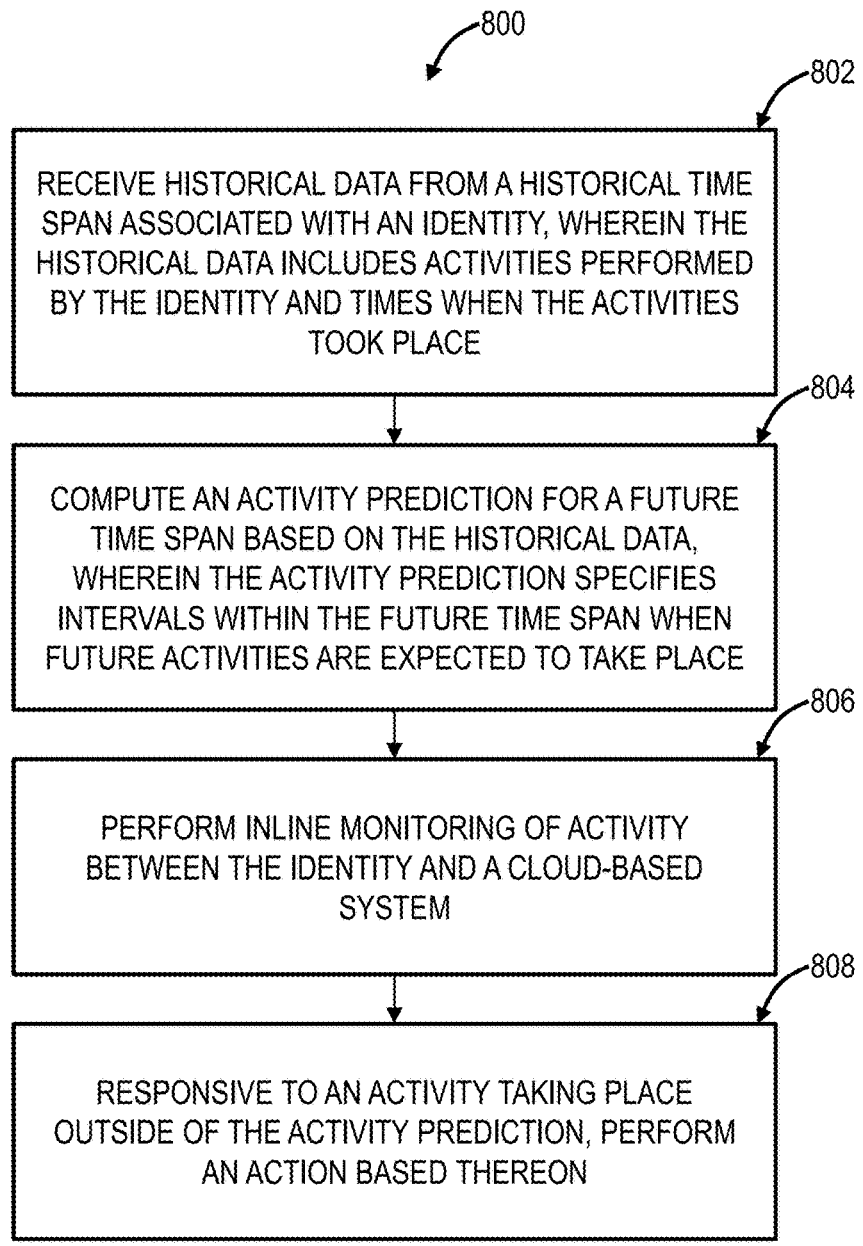
FIG. 8 is a flowchart of a process for cloud activity anomaly detection.

FIG. 8 is a flowchart of a process 800 for cloud activity anomaly detection. The process 800 includes receiving historical data from a historical time span associated with an identity, wherein the historical data includes activities performed by the identity and times when the activities took place (step 802); computing an activity prediction for a future time span based on the historical data, wherein the activity prediction specifies intervals within the future time span when future activities are expected to take place (step 804); performing inline monitoring of activity between the identity and a cloud-based system (step 806); and responsive to an activity taking place outside of the activity prediction, performing an action based thereon (step 808).

The steps can further include wherein the activity prediction indicates whether activity is expected or not expected by the identity within each of the intervals of the future time span. The future time span can be a week and each of the intervals can be one hour, wherein the activity prediction specifies during which hours of the week activity is expected for the identity. The steps can further include computing an anomaly score for each interval based on the activity prediction, wherein the anomaly score represents a risk associated with an activity taking place during each of the intervals. An action can be performed responsive to an activity taking place during an interval with an anomaly score which exceeds a threshold. The identity can be a human identity or a non-human identity. The steps can further include providing a Graphical User Interface (GUI) displaying a visualization of the historical data, the activity prediction, and monitored data. The steps can further include computing an in-sample activity prediction for a time span within the historical time span; and computing a confidence score based on a comparison of the in-sample activity prediction and historical data from the time span. The action can include notifying an administrator of the activity. The inline monitoring can include comparing real-time activity of the identity to the activity prediction.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause a processor to:
receive historical data from a historical time span associated with an identity, wherein the historical data includes activities performed by the identity and times when the activities took place;
compute an activity prediction for a future time span based on the historical data, wherein the activity prediction specifies intervals within the future time span when future activities are expected to take place, wherein the activity prediction indicates whether activity is expected or not expected by the identity within each of the intervals of the future time span, and wherein the future time span is a week and each of the intervals is one hour, and wherein the activity prediction specifies during which hours of the week activity is expected for the identity;
perform inline monitoring of activity between the identity and a cloud-based system; and
responsive to an activity taking place outside of the activity prediction, perform an action based thereon.

2. The non-transitory computer-readable medium of claim 1, wherein the instructions further cause the processor to:
compute an anomaly score for each interval based on the activity prediction, wherein the anomaly score represents a risk associated with an activity taking place during each of the intervals.

3. The non-transitory computer-readable medium of claim 2, wherein an action is performed responsive to an activity taking place during an interval with an anomaly score which exceeds a threshold.

4. The non-transitory computer-readable medium of claim 1, wherein the identity is a human identity or a non-human identity.

5. The non-transitory computer-readable medium of claim 1, wherein the instructions further cause the processor to:
provide a Graphical User Interface (GUI) displaying a visualization of the historical data, the activity prediction, and monitored data.

6. The non-transitory computer-readable medium of claim 1, wherein the instructions further cause the processor to:
compute an in-sample activity prediction for a time span within the historical time span; and
compute a confidence score based on a comparison of the in-sample activity prediction and historical data from the time span.

7. The non-transitory computer-readable medium of claim 1, wherein the action includes notifying an administrator of the activity.

8. The non-transitory computer-readable medium of claim 1, wherein the inline monitoring includes comparing real-time activity of the identity to the activity prediction.

9. A method comprising steps of:
receiving historical data from a historical time span associated with an identity, wherein the historical data includes activities performed by the identity and times when the activities took place;
computing an activity prediction for a future time span based on the historical data, wherein the activity prediction specifies intervals within the future time span when future activities are expected to take place, wherein the activity prediction indicates whether activity is expected or not expected by the identity within each of the intervals of the future time span, and wherein the future time span is a week and each of the intervals is one hour, and wherein the activity prediction as during which hours of the week activity is expected for the identity;
performing inline monitoring of activity between the identity and a cloud-based system; and
responsive to an activity taking place outside of the activity prediction, performing an action based thereon.

10. The method of claim 9, wherein the steps further comprise:
computing an anomaly score for each interval based on the activity prediction, wherein the anomaly score represents a risk associated with an activity taking place during each of the intervals.

11. The method of claim 10, wherein an action is performed responsive to an activity taking place during an interval with an anomaly score which exceeds a threshold.

12. The method of claim 9, wherein the identity is a human identity or a non-human identity.

13. The method of claim 9, wherein the steps further comprise:
providing a Graphical User Interface (GUI) displaying a visualization of the historical data, the activity prediction, and monitored data.

14. The method of claim 9, wherein the steps further comprise:
computing an in-sample activity prediction for a time span within the historical time span; and
computing a confidence score based on a comparison of the in-sample activity prediction and historical data from the time span.

15. The method of claim 9, wherein the action includes notifying an administrator of the activity.

16. The method of claim 9, wherein the inline monitoring includes comparing real-time activity of the identity to the activity prediction.

* * * * *